Figure 1:
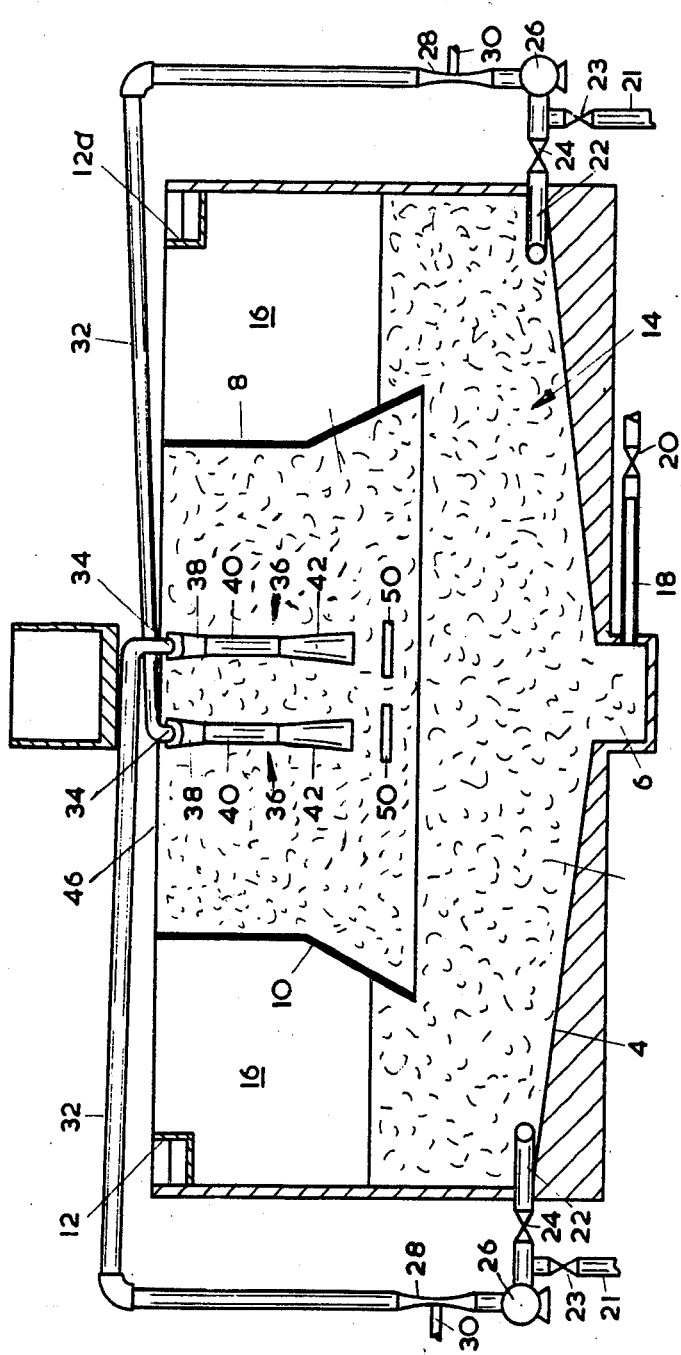

United States Patent [19]

Kite

[11] 4,440,645

[45] Apr. 3, 1984

[54] DISSOLVING GAS IN A LIQUID

[75] Inventor: Oliver A. Kite, West Wickham, England

[73] Assignee: The BOC Group plc, London, England

[21] Appl. No.: 439,498

[22] Filed: Nov. 4, 1982

[51] Int. Cl.³ .................................................. C02F 3/22
[52] U.S. Cl. .................................. 210/626; 210/621; 210/629; 210/195.3; 210/197; 210/220; 261/36 R; 261/123; 261/DIG. 75
[58] Field of Search ............... 210/626, 629, 220, 621, 210/623, 622, 195.3, 194, 195.1, 197; 261/36 R, 123, DIG. 75

[56] References Cited

U.S. PATENT DOCUMENTS

| 2,502,349 | 3/1950 | Sebald | 210/220 |
| 3,043,433 | 7/1962 | Singer | 210/629 |
| 3,152,982 | 10/1964 | Pagnotti | 210/629 |
| 3,162,702 | 12/1964 | Tonner | 210/220 |
| 3,498,459 | 3/1970 | Bohnke | 210/220 |
| 3,723,545 | 3/1973 | Nagel | 261/DIG. 75 |
| 3,938,738 | 2/1976 | Nagel | 261/DIG. 75 |
| 3,945,922 | 3/1976 | Jagusch | 210/220 |
| 4,000,227 | 12/1976 | Garrett | 261/DIG. 75 |
| 4,162,971 | 7/1979 | Zlokarnik | 261/DIG. 75 |
| 4,196,074 | 4/1980 | Garrett | 210/629 |
| 4,198,359 | 4/1980 | Todd | 210/220 |
| 4,207,180 | 6/1980 | Chang | 210/220 |
| 4,256,575 | 3/1981 | Garrett | 210/629 |
| 4,374,730 | 2/1983 | Braha | 210/629 |

FOREIGN PATENT DOCUMENTS

| 147860 | 8/1949 | Australia | 210/626 |
| 2355554 | 1/1978 | France | 261/DIG. 75 |

Primary Examiner—Ernest G. Therkorn
Attorney, Agent, or Firm—David L. Rae; Larry R. Cassett

[57] ABSTRACT

A method and an apparatus for dissolving gas in a body of sewage comprising providing a skirt member having a lower open end extending upwardly from said body of sewage to define a volume of said sewage separate from an adjacent body of clarified liquid in said tank, removing a flow of sewage from said body of sewage and pressuring said flow, introducing oxygen into said pressurized flow to form a mixture of oxygen and sewage, introducing said mixture as a jet downwardly into the inlet of a chamber disposed in said volume defined by said skirt member to induce sewage in said chamber and thereby oxygenate said sewage, discharging said oxygenated sewage downwardly through an outlet of said chamber at a reduced velocity, and reducing the momentum of said discharged oxygenated sewage by directing the same onto baffles spaced from the outlet of said chamber.

6 Claims, 2 Drawing Figures

DISSOLVING GAS IN A LIQUID

This invention relates to dissolving gas in a liquid in which the gas is sparingly soluble. It is particularly concerned with dissolving oxygen in water, for example, as part of a process for treating sewage or other aqueous effluent or waste having a biochemical oxygen demand.

Traditionally, sewage has been treated by aerobic micro-organisms that break down offensive substances. In order to provide the micro-organisms with oxygen essential for their respiration, the sewage is aerated. A typical sewage treatment process includes the stage in which the sewage is aerated and contacted with "activated sludge" containing the necessary aerobic micro-organisms and a subsequent stage in which the treated sewage is allowed to settle into two layers, one being of clear, treated water, the other containing the activated sludge. Pure water is run-off from the upper layer. Typically, in the treatment of municipal sewage, there is also a preliminary settling stage in which coarse solids are removed before the activated sludge treatment is carried out. Since the sewage is agitated to help dissolve air therein, the activated sludge and settling stages are conventionally performed in separate vessels.

It has been proposed, for example, in our German Offenlegungsschrift (OLS) No. 2 804 197 (whose equivalent UK complete specification is to be published on Aug. 26, 1981 under the No. 1 596 311) to perform the bacterial or activated sludge treatment of oxygenated sewage in the same vessel as the clarification of the sewage. This therefore makes possible a reduction in the number of tanks required for the treatment of the sewage and therefore makes the process attractive to owners of industrial plant producing sewage or aqueous effluent having a biochemical oxygen demand.

It is necessary to ensure that the oxygenation does not disturb the process of clarification. It has been proposed to oxygenate streams of incoming sewage and recycled liquid containing sludge outside a treatment vessel and to introduce the stream into the vessel at relatively low velocity. One known oxygenated apparatus that meets this requirement employs two concentric, vertically-disposed, cylindrical chambers, one being of greater diameter than the other. The upper chamber is open at its lower end which forms the inlet to the lower chamber. An annular flange is fitted between the lower end of the upper and the upper end of the lower chamber so as to make a fluid-tight seal therebetween. Waste water containing oxygen is introduced into the top of the upper chamber through an inlet and is caused to flow downwards into and through the lower chamber. From there, it is discharged into the body of liquid being treated. Typically, the oxygenation apparatus and liquid to be oxygenated is passed through it continuously. Flow of liquid through the upper chamber is such as to give a prolonged contact time between the bubbles of oxygen and the waste water. As the waste water passes from the upper chamber to the lower chamber, so it undergoes a reduction in its velocity with a consequence that bubbles of gas tend to coalesce in the lower chamber and then rise through the upper chamber into a turbulent zone in which the gas is first introduced into the waste water. This turbulence tends to cause the bubbles of gas to be reduced in size and to pass down again into the chamber.

Such equipment tends to be relatively large and cumbersome. Moreover, it has been known for the annular plate forming a sealing between the two chambers to be subjected to a force of several tons which can cause flexure of the plate and consequential leakage. It is also possible to reinforce the plate internally of the lower chamber but this in turn gives rise to constructional difficulties and may also adversely affect the efficiency of the oxygen dissolving equipment. For example, if crude sewage is being oxygenated, rags and other materials in the sewage may be caught on the reinforcement and thus provide a blockage in the oxygenation equipment.

It is an aim of the present invention to provide an alternative method and apparatus for oxygenating or dissolving gas in a liquid suitable for use in sewage (or other aqueous effluent having a biochemical oxygen demand) in a vessel in which biological treatment and clarification both take place.

According to the present invention there is provided a method for dissolving gas in a body of liquid in which the gas is sparingly soluble, comprising the steps of: withdrawing a stream of liquid from the said body of liquid, pressurising the stream, introducing oxygen into the pressurised stream such that only a portion of the oxygen dissolves, the undissolved oxygen being carried in the stream in the form of bubbles, introducing said stream as a jet into an open-ended chamber, said chamber being submerged within the body of liquid, said stream inducing flow of liquid from outside the chamber into said chamber, the stream and the liquid induced into the chamber becoming mixed and the resulting flow of mixed liquid being reduced in velocity upstream of its discharge from the outlet of the chamber.

The invention also provides apparatus for performing the above method, comprising: means for withdrawing and pressurising a stream of liquid from a vessel containing a body of liquid, means for introducing gas into said stream, an open-ended chamber situated in said vessel and able to be immersed in the liquid, at least one nozzle whose outlet is situated near to or within the chamber and which communicates with the outlet end of said pumping means, the chamber having an upstream portion for inducing flow of liquid from within the vessel and outside the chamber into the chamber, an intermediate mixing portion and a downstream decelerating portion.

The method and apparatus according to the present invention are primarily intended for oxygenating aqueous effluent having a biochemical oxygen demand.

The chamber is preferably generally tubular. Conveniently, the upstream portion has walls converging towards the intermediate portion, and the downstream portion has walls diverging away from the intermediate portion.

The stream is preferably introduced into the chamber as a jet through at least one nozzle typically located within the upstream portion of the chamber or just upstream thereof.

Typically the jet nozzle is concentric with the tubular chamber.

If desired, the chamber may be generally vertically disposed, or may be included at a small angle to the vertical.

The method and apparatus according to the present invention are particularly suited for performing an effluent treatment process in which clarification and biological treatment take place in the same vessel. Preferably, the chamber is located within a volume of suspended activated sludge (or the like), typically in an upper portion of the vessel kept separate from the clear liquid therein by a stilling box or suitable arrangement of baffles, or both.

Typically, turbulence created in the chamber by introducing the jet of liquid into such chamber reduces the size of the undissolved bubbles of gas and thereby facilitates dissolution of the bubbles in the liquid. Typically, however, not all the gas is dissolved immediately. It is not necessary to dissolve all the gas in the chamber. Indeed, with the chamber generally vertically located, with its outlet below it inlet, the velocity of the liquid leaving the chamber may be arranged to be greater than the terminal rise velocity of the bubbles such that some bubbles will be swept out of the chamber with the liquid leaving it. Although it has previously been though that such discharge of bubbles of undissolved gas can adversely afffect a sewage treatment process in which clarification and biological treatment take place in the same, we believe that we can avoid any substantial deleterious effect by preventing substantially all such bubbles entering the clear liquid. In order to achieve this end, we prefer to employ baffle or baffles to help guide rising bubbles of gas away from the clear liquid.

In another preferred embodiment of the invention, the inlet to the chamber is preferably located near to the surface of mixed liquor containing aerobic micro-organisms that partake in the biological treatment of the aqueous effluent, whereby the flow of the mixed liquor from said surface is induced into the chamber. This helps to break any layer of scum or oily substances forming at the top of the surface of the mixed liquid.

If desired, a baffle may be located outside but proximate to the outlet of each chamber so as to reduce the momentum of liquid leaving the chamber. Typically, such baffle is situated generally perpendicularly to the axis of the chamber.

Figure 2:
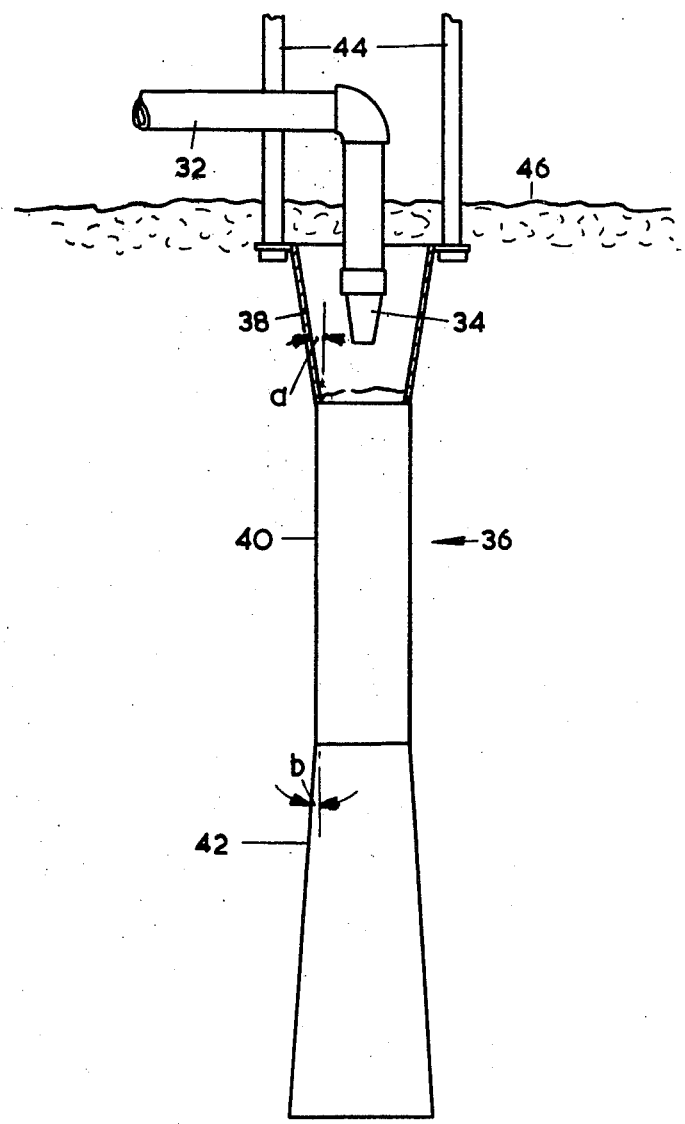

The method and apparatus according to the present invention will now be described by way of example with reference to the accompanying drawings, in which:

FIG. 1 is a schematic side elevation, partly in section, of the sewage treatment plant, and FIG. 2 is a schematic side elevation, partly in section, of part of the apparatus shown in FIG. 1.

The drawings are not to scale.

Referring to FIG. 1, a tank 2 has a floor 4 which slopes inwardly towards a central well 6. Supported (by means not shown) at the top of the tank 2 is a centrally located vertically disposed, downwardly extending tubular baffle member 8 having at its lower end a skirt 10 diverging in the direction of the floor 4 of the tank 2. In operation of the tank to treat biologically and clarify sewage or other aqueous effluent having a biochemical oxygen demand, an upper annular region or layer 16 of clear liquid is established around the baffle 8 and an upper portion of the skirt 10. In the rest of the vessel a biological (or bacterial) treatment region 14 is established. At the top of the 2 is a generally circular weir 12 over which clear liquid from the layer 16 can flow and be withdrawn from the tank 2. The clear layer 16 is formed as a result of the tendency for aerobic micro-organisms in the sewage or other effluent, typically in the form of activated sludge, to settle. Typically, such activated sludge is a naturally-occuring constituent of the sewage, but, if necessary, the sewage can be seeded with activated sludge taken from a conventional municipal or other activated sludge sewage treatment process. Any heavy or coarse solids in the sewage will tend to sink to the floor 4 of the tank 2 into the well 6 from which they may be withdrawn from time to time through pipe 18 by opening valve 20 and, if necessary, applying suitable suction means (not shown). If desired, the floor of the tank 2 may be fitted with a scraper (not shown) to force solids collecting on the floor 4 into the well 6. Such scrapers are well known in the art and will not be described herein.

Located near the bottom of the tank 2 in the biological reaction zone or region 14 are inlets to two pipes 22. Typically, the two said inlets are diametrically opposed to one another. Each pipe 22 has its own valve 24 disposed therein and ends in its own sewage pump 26. Associated with each pipe 22 is an inlet pipe 21 for incoming sewage for treatment. Each pipe 21 communicates with a region of a respective pipe 22 downstream of the valve 21 therein. A stop valve 23 is located in each pipe 21. The outlet of each pump 26 communicates with a pipeline 32 ending in a jet nozzle 34 situated within the volume of liquid confined by the baffle 8 a relatively short distance below the surface 46 of such liquid. Each pipeline 32 has a venturi 28 in it. Each venturi 28 has an inlet 30 for oxygen.

Each jet nozzle 34 is situated just inside a generally tubular open-ended chamber 36. Each chamber 36 is generally vertically disposed and situated within the volume of liquid surrounded by the baffle 8 and skirt 10. Each chamber 36 comprises an uppermost portion 38 that converges towards an intermediate, generally right cylindrical, hollow intermediate portion 40. The portion 40 ends in a diverging decelerator portion 42, the divergence being in the direction away from the nozzle 34. Typically, the angle (a) shown in FIG. 2 is 10° and the angle (b) shown in FIG. 2 is 4°. Each chamber 36 is supported by adjustable support rods 44. The rods may be adjusted so as to submerge the top of the chamber 36 a chosen distance below the surface 46 of the liquid. Typically, this distance is in the order of 15 cm.

In operation, an aqueous suspension of activated sludge is withdrawn from a lower portion of the biological reaction region 14 and passes through the pipes 22 where it becomes mixed with incoming sewage for treatment supplied from the pipes 21. The mixture of activated sludge suspension and incoming sewage formed in each pipe 22 is then pressurised in the respective pumps 26. Typically, the pressure is raised to a value in the range 1.5 to 4 atmospheres absolute. Each stream of pressurised liquid then flows through its respective venturi 28, such flow inducing a flow of oxygen into the liquid at a turbulent region thereof, such turbulence being created by the throat of the venturi. Bubbles of oxygen are thus formed in each pressurised stream of liquid. Some of the oxygen so introduced will dissolve, but this will generally be only a minor proportion. Typically, some 70 to 90% of the oxygen remains undissolved and is carried by the pressurised streams as undissolved bubbles. The proportion of oxygen added to the pressurised liquid may be more than the quantity required to saturate that stream with dissolved oxygen at the operating pressure.

It is important that the undissolved gas remains in the form of dispersed bubbles which do not combine to create slug flow or rise to the surface of the liquid to form a stratified gas phase, both of which of conditions will prevent the undissolved gas from being carried into the main body of liquid in the tank 2 in a form in which it can be readily dissolved or consumed therein. We have found that the velocity of each pressurised stream needs to be at or above a particular limiting value (sometimes known as the slug flow rate) in order to ensure that slug flow or stratification does not occur. This limiting value can be determined empirically for different systems and should be related to the size range of gas bubbles present.

The oxygenating gas is typically pure oxygen. If desired, however, oxygen-enriched air may be used instead. Nonetheless, it is generally desirable to keep to a minimum the amount of nitrogen or other gas mixed with the oxygen. Therefore, we prefer not to use oxygen-enriched air containing less than 65% by volume of oxygen.

The oxygenated streams of pressurised liquid pass along the pipeline 32 and enter the chambers 36 through the jet or expansion nozzles 34, each of which is generally frusto-conical in shape with its outlet being narrower than its inlet. Each nozzle ejects a liquid/gas mixture promoting mixing and causing oxygen bubbles to be reduced in size as a result of the turbulence that the jet or expansion nozzle creates. This facilitates dissolution of the oxygen bubbles and in consequence typically about 95% of the oxygen added is dissolved upstream of the outlets of the chambers 36.

The flow of liquid/gas mixture into the convergent portion 38 of each chamber 36 induces a flow of water containing activated sludge from the volume surrounded by the baffle 8, including the liquid surface 46, into the convergent portion 38 of each chamber 36. Typically, such induced flow of liquid may be from 3 to 7 times greater than the flow rate of the pressurised liquid through the nozzles 34. Since the micro-organisms in the biological reaction or treatment region 14 respire dissolved oxygen, the dissolved oxygen concentration in the induced flow of liquid will be considerably less than that in the oxygenated, pressurised streams introduced into the chambers 36 through the nozzles 34. Consequently, a proportion of the undissolved bubbles of oxygen entering the right cylindrical portion 40 of each chamber 36 dissolve before they reach the lowermost divergent section 42. Thus, the rate of adding oxygen to the venturies 28 can be chosen to be well in excess of that required to saturate the pressurised streams without a large proportion of it remaining undissolved after leaving the chambers 36.

The cylindrical portion 40 of each chamber 36 is typically 2 to 3 times longer than the convergent portion 38 so as to ensure that the induced flow of liquid is thoroughly mixed with the liquid introduced into each chamber through its nozzle 34. The divergent portion 42 is adapted to decelerate the mixed stream of liquid passing through the chamber 36. Typically, the portion 42 is longer than the portion 40. Typically, the stream or jet of liquid issuing from each nozzle 34 may have a velocity in the order of 3 to 12 meters per second and the liquid leaving the outlet end of the decelerator portion 42 of each chamber 36 a velocity in the order of 0.75 meters per second and generally less than 1 ms−1. This exit velocity is in excess of the terminal bubble rise velocity. Thus, undissolved bubbles of oxygen do not have sufficient bouyancy to rise against the downward flow of liquid through the chambers 36 and are therefore swept out of the chambers with the liquid emanating therefrom. Typically up to 5% by volume of the oxygen added through the inlets 30 may remain undissolved.

The purpose of oxygenating the liquid in the biological reaction zone 14 is to meet the respiration needs of the micro-organisms in the activated sludge that break down offensive organic pollutants in the incoming sewage. The overall requirements of the sewage for oxygen can be measured in terms of its biochemical oxygen demand and the rate of oxygenation may be chosen so as to satisfy this demand by maintaining positive concentrations of dissolved oxygen within the reaction zone or region 14.

In order for the biological treatment to take place adequately it is desirable to maintain the activated sludge in suspension in a relatively large proportion of the volume within the tank 2. In other words, the volume 16 of clear liquid in the vessel will be limited. It is thus desirable to provide in the vessel or tank 2 a degree of circulation of liquid without of course preventing adequate clarification from taking place. The streams of liquid leaving the chambers 36 are able to provide such circulation below the skirt 10. This happens because such streams of liquid tend to be reflected off the floor 4 of the tank 2 back up towards the volume surrounded by the skirt 10. The apparatus is arranged such that liquid leaving the chambers 36 possesses insufficient momentum for the turbulence in the region 14 to disturb the settling of sludge and thereby clarification from taking place.

The chambers 36 may each have associated therewith baffles 50 for reducing the momentum of the liquid leaving the outlets thereof.

There is also a pronounced flow of liquid from the upper region of the liquid within the baffle 8 into the mixing chambers 36. This helps to cause the necessary circulation or movement of liquid within the volume of liquid kept separate from the clear liquid by the baffle 8 and its skirt 10.

The above-described circulation of liquid in both in an upper part and a lower part of the vessel helps to maintain a generally even distribution of activated sludge throughout the biological treatment region 14.

Preferably, the chambers 36 are located towards the centre of the volume surrounded by the baffle 8 and its skirt 10 and well away from such baffle and skirt. This is so as to ensure that substantially undissolved bubbles leaving the chambers 36 are not carried into regions of the vessel 2 from where they subsequently rise into the volume 16 clear liquid. Solid particles of sludge can adhere to the bubbles and be lifted to the surface of the liquid in the tank 2 thereby. We prefer to ensure that any such particles of sludge, or fat, that rise to the surface in this way are kept within the baffle means 8. In this respect, the skirt 10 collects bubbles and directs them into the volume surrounded by the baffle 8. Any such solids or fat rising to the surface will tend to be disturbed therefrom by the circulation created by the action of the jets of liquid leaving the nozzles 34 and inducing flow of liquid into the chambers 36 from the surface of the liquid 46.

Typically, in operation, there is a continuous flow of sewage into the illustrated plant through the pipes 21 and a continuous clarification of the liquid. Thus, clear liquid will overflow the weir 12 substantially continuously and can be discharged to the environment or treated further.

It is not necessary for the oxygenation to be continuous. If desired, a dissolved oxygen meter may be located within the biological treatment region 14 at a location which is not directly impinged upon by the streams of liquid leaving the chambers 36, and oxygen introduced once the sensed dissolved oxygen concentration falls below a chosen level (say 1 ppm) the oxygenation may be continued until the level of dissolved oxygen has been restored to say 3 ppm. Typically, such introduction of oxygen may be controlled automatically by arranging for the dissolved oxygen meter to generate signals effective to open or close, as appropriate, an automatic (say solenoid operated) valve (not shown) in each oxygen pipe 30.

Typically, at least one of the pressurised streams of sewage and liquid containing suspended sludge is passed into the reaction zone or region 14 through the nozzle 34 and chamber 36 continuously. If desired, the other such stream may be passed only during periods when oxygen is being added. Thus, the dissolved oxygen meter may be arranged to generate a signal which switches off one of the pumps 26 at the same time as closing the valves (not shown) in the oxygen pipes 30.

The rate of recycling liquor from the reaction zone 14 is typically chosen to be many times greater than the rate at which incoming sewage is mixed therewith. The relative rate of recycle generally required will depend on the biochemical oxygen demand of the incoming sewage. Generally, the greater the biochemical oxygen demand, the greater needs to be the ratio of the rate of recycle to the rate of inflow of sewage for treatment. Typically, the ratio may be in the order of 10 to 20:1. It must be borne in mind, however, that the oxygen that can be added to the recycle streams can be sufficient not only to obtain good levels of dissolved oxygen in such stream but also to oxygenate the liquid induced into the chambers 36 by the action of the jets 34. Thus, the effective recycle rate will be greater.

I claim:

1. A method of treating sewage containing aerobic micro-organisms in a single tank having a body of said sewage in the lower portion of said tank and clarified liquid thereabove comprising the steps of:
   providing a skirt member having a lower open end extending upwardly from said body of sewage to define a volume of said sewage separate from an adjacent body of clarified liquid in said tank;
   removing a flow of sewage from said body of sewage and pressurizing said flow;
   introducing oxygen into said pressurized flow to form a mixture of oxygen and sewage;
   introducing said mixture as a jet downwardly into the inlet of a chamber disposed in said volume defined by said skirt member to induce sewage in to said chamber and thereby oxygenate said sewage;
   discharging said oxygenated sewage downwardly through an outlet of said chamber at a reduced velocity; and
   reducing the momentum of said discharged oxygenated sewage by directing the same onto baffles spaced from the outlet of said chamber such that undissolved oxygen is substantially retained in said volume and is substantially precluded from entering said body of clarified liquid.

2. The method defined in claim 1 in which said flow is discharged as a jet through a nozzle located in the upstream portion of said chamber.

3. The method defined in claim 2 wherein said flow is discharged from said nozzle at a velocity of about 3-12 meters per second with sewage being discharged from said chamber with a velocity greater than the terminal rise velocity of undissolved oxygen.

4. The method defined in claim 1 wherein the inlet of said chamber is disposed below but near the surface of sewage in said volume such that said sewage is induced to flow through said inlet into said chamber.

5. Apparatus for treating sewage containing aerobic micro-organisms in a single tank having a body of said sewage in the lower portion of said tank and clarified liquid thereabove in the tank comprising:
   a skirt member having a lower open end extending upwardly from said body of sewage to define a volume of said sewage separate from an adjacent body of clarified liquid in said tank;
   means for removing a flow of sewage from said body of sewage and means for pressurizing said removed flow;
   means for introducing oxygen into said pressurised flow to form a mixture of oxygen and sewage;
   means for introducing said mixture as a jet downwardly into the inlet of a chamber disposed in said volume defined by said skirt member to draw sewage into said chamber and thereby oxygenate said flow of sewage; and
   baffle means spaced from the outlet of said chamber for reducing the momentum of said oxygenated sewage such that undissolved oxygen is substantially retained in said volume and is substantially precluded from entering said body of clarified liquid.

6. The apparatus defined in claim 5 wherein said chamber is comprised of an eductor having a converging inlet portion and a diverging outlet portion separated by a substantially cylindrical center portion.

* * * * *